Figure 1:
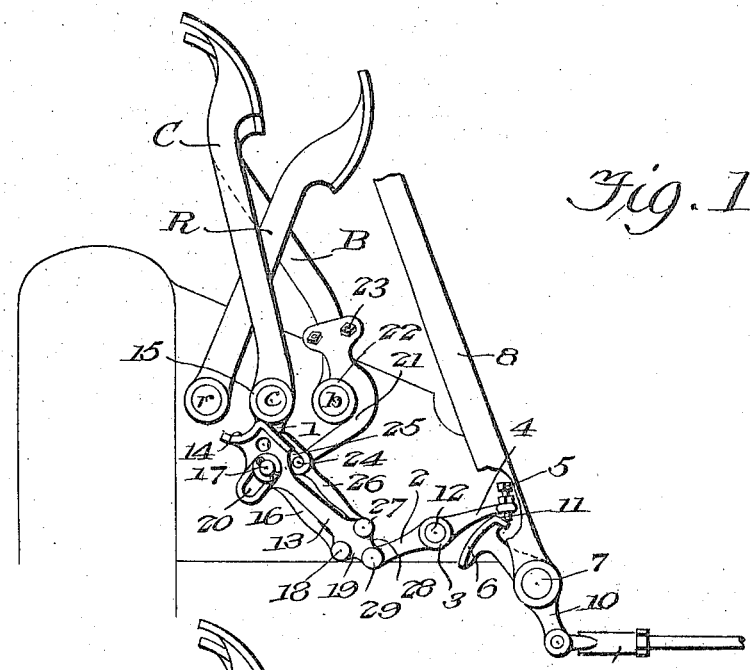

G. C. PLUMMER.
AUTOMOBILE CONTROL.
APPLICATION FILED JAN. 7, 1916.

1,188,011.

Patented June 20, 1916.
2 SHEETS—SHEET 1.

Witnesses
Hugh H. Ott
P. M. Smith

Inventor
George C. Plummer
By Victor J. Evans
Attorney

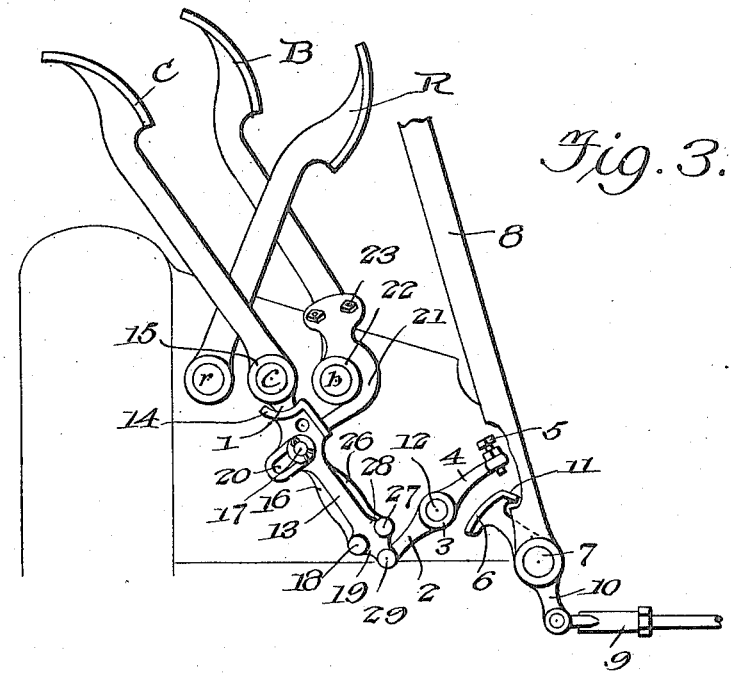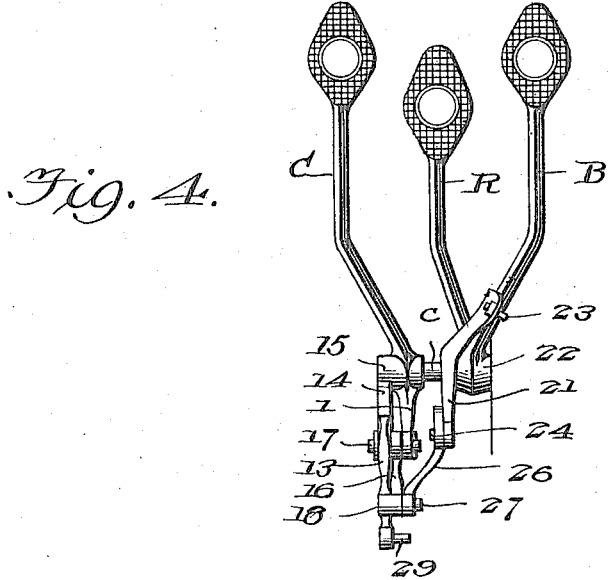

UNITED STATES PATENT OFFICE.

GEORGE C. PLUMMER, OF GROVER HILL, OHIO.

AUTOMOBILE CONTROL.

1,188,011.  Specification of Letters Patent.  Patented June 20, 1916.

Application filed January 7, 1916. Serial No. 70,829.

*To all whom it may concern:*

Be it known that I, GEORGE C. PLUMMER, a citizen of the United States, residing at Grover Hill, in the county of Paulding and State of Ohio, have invented new and useful Improvements in Automobile Controls, of which the following is a specification.

This invention relates to automobile controls, the object in view being to simplify the present day control used on automobiles for shifting to the different speeds and also shifting into reverse, and for shifting the clutch and also for applying and releasing the brake mechanism, the control, as a whole, being similar to that used in connection with what is known as planetary transmission gearing and entirely doing away with the necessity of using the emergency brake lever in order to hold the clutch controlling lever in a neutral position.

By means of the construction hereinafter described and illustrated in the drawings, to stop the car it is only necessary to apply pressure on the brake pedal which serves not only to apply the brake but to first move the clutch shifting lever into its neutral position and latch the same in such position. To start the car, it is only necessary to operate the clutch pedal to put the car in what is known as low speed, whereupon the clutch shifting lever is automatically released or unlatched and the brake pedal is returned to its initial or non-braking position. After the car has been brought to a stop, if the operator desires to back the car, it is only necessary to press against the reverse pedal.

With the above and other objects in view, the invention consists in the novel construction, combination and arrangement of parts, as herein described, illustrated and claimed.

Figure 2:
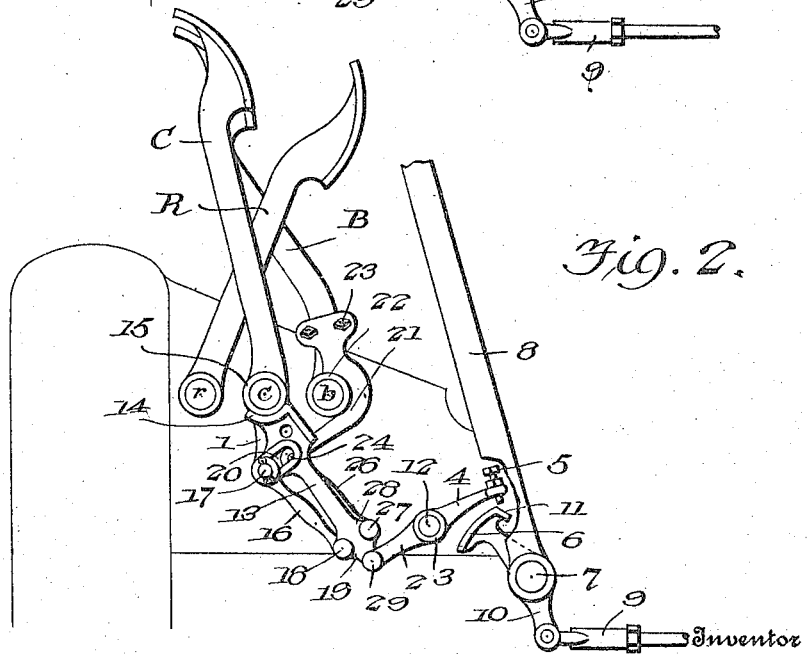

In the accompanying drawings:—Figure 1 is a side elevation of the mechanism of this invention showing also a portion of the transmission casing, the parts being shown in position for high speed. Fig. 2 is a view showing the parts in neutral position after the car has been stopped by the brake pedal alone. Fig. 3 is a similar view showing the position assumed by the parts in low speed. Fig. 4 is a rear elevation of the same parts.

C designates the clutch pedal, B the brake pedal and R the reverse pedal, said reference characters being used to designate not only the pedals or tread portions proper but the arms which connect the treads to the respective shafts $c$, $b$ and $r$, it being understood that the shafts $r$ and $c$ operate the bands which surround the ordinary planetary transmission gearing.

Under the ordinary arrangement now in common use, the clutch pedal C is provided with a downwardly extending short arm 1 which is connected by means of a link to the forwardly extending arm 2 of a clutch shifting lever 3, the other arm 4 of which carries an adjustable screw 5 which is designed to come in contact with a movable rest 6 connected to the shaft 7 of the emergency brake, 8 designating the emergency brake lever and 9 a portion of the brake operating connections controlled and actuated by another arm 10 on the shaft 7. In addition to the supporting face of the rest 6, the latter is provided with an inclined shoulder or cam face 11 which, when the emergency lever 8 is moved in the proper direction, acts against the lower end of the screw 5, lifting the arm 4 and turning the clutch operating shaft 12 to a neutral or non-clutching position.

In carrying out the present invention, I employ a latch 13, 14 designating the latch face thereof which is concaved as shown to fit under the collar 15 of the clutch pedal C, which collar 15 surrounds the shaft $c$ and bears a fixed relation to said shaft. A clutch link 16 is connected by a pivot 17 to the arm 1 of the clutch pedal and is pivotally connected at its opposite extremity at 18 to a lateral extension 19 of the latch 13. The latch is formed with a slot 20 extending transversely with respect to the length of the latch, enabling the latch to swing to an extent equal to the length of the slot 21 for the purpose of shifting the working face 14 of the latch into and out of engagement with the collar 15 which in effect forms a stop shoulder for the latch.

The brake pedal B has fixedly secured thereto an arm 21 which partially embraces the collar 22 of the brake pedal, the arm 21 being fastened by means of a clip 23 or its equivalent to the brake pedal and being provided at its free end with a laterally extending pin or stud 24 which is slidable in a slot 25 in a brake link 26, the latter being pivotally connected at 27 to another extension 28 of the latch 13, the extensions 19 and 28 being arranged at opposite sides of the longitudinal center or major axis of the latch. The latch 13 is pivotally connected at 29 to the arm 2 of the clutch lever 3.

From the foregoing description, taken in connection with the accompanying drawings, the operation will now be understood to be as follows. Starting with the parts in the position shown in Fig. 1, the machine being then in high speed, in order to stop the car the operator presses against the brake pedal B. By means of the arm 21 bearing a fixed relation to said brake pedal, a downward pressure is exerted by the link 26 on the pivot 27 of the latch and simultaneously the latch 13 is depressed by the link 26 thereby depressing the arm 2 of the clutch lever 3 and turning the shaft 12 to neutral position. Simultaneously with this movement, the latch 13 is rocked to the position shown in Fig. 2 thus locking or latching the clutch lever 3 in its neutral position. The parts have now assumed the position illustrated in Fig. 2, the last named position having been brought about solely by operating the brake pedal B.

With the parts in the position shown in Fig. 2, the operator having released the brake pedal B, if he desires to back the machine, it is only necessary for him to press against the reverse pedal R as the brake has been released by removing pressure from the brake pedal B, the clutch lever remaining latched in neutral position. When the operator desires to start the machine ahead, it is only necessary to bring pressure to bear against the clutch pedal C in a forward direction whereupon the arm 1 causes the link 16 to press downwardly on the pivot 18, thereby pressing downwardly on the latch 13 and the arm 2 of the clutch lever. This throws the transmission gearing into low speed and at the same time rocks the latch 13 out of its operative or latching position. The machine is now in low speed and the clutch lever 3 is unlatched. To obtain high speed, the operator now merely releases the clutch pedal C when it is moved to its rearward position by the ordinary clutch operating spring (not shown), the arm 2 of the clutch lever rising and carrying the latch 13 to the position shown in Fig. 1, this being the position assumed by the parts at the beginning of the description of the operation. It will be observed that the mechanism above described does not interfere in any way with the ordinary use of the emergency brake lever 8 nor with the use of the member 6 which operates to sustain the clutch lever 3 in its neutral or non-clutching position while the machine is standing still with the emergency brake applied.

Under the arrangement in common use up to this time, in order to stop the car it was necessary to push the clutch pedal into neutral position and hold it there while pushing on the brake pedal. In addition to this it was necessary to pull back the emergency brake lever before removing the foot from the clutch pedal. With this attachment, it is only necessary to push the brake pedal alone which stops the car and locks the clutch lever in neutral position. Formerly, to start the car it was necessary to hold the clutch pedal in neutral position until the emergency lever was pushed forward, the operator then pushing forward on the clutch pedal for low speed and releasing it to obtain high speed. With the present mechanism it is only necessary to push the clutch pedal forward to obtain low speed and release said pedal to obtain high speed. Formerly, in order to reverse, it was necessary to either pull back the emergency lever part way or hold the clutch pedal in a certain position while pushing against the reverse pedal. Under the present invention, it is only necessary to press against the reverse pedal. It will thus be seen that the control mechanism is greatly simplified and all of the principal operations required in stopping and starting the car and proceeding from low gear to high gear or reverse may be accomplished independently of and without using the emergency brake lever.

Having thus described my invention, I claim:—

1. In automobile control, the combination of a clutch pedal, a brake pedal, a clutch lever, a link having a positive connection with the brake pedal and with the clutch lever, and a latch thrown into latching position by the application stroke of the brake pedal and serving to sustain the clutch lever in non-clutching position.

2. In automobile control, the combination of a clutch pedal, a brake pedal, a clutch lever, a link having a positive connection with the brake pedal and with the clutch lever, a latch thrown into latching position by the application stroke of the brake pedal and serving to sustain the clutch lever in non-clutching position, and means controlled by the clutch pedal for releasing said latch and freeing the clutch lever.

3. In automobile control, the combination of a clutch pedal, a brake pedal, a clutch lever, an arm on the brake pedal, a link having a positive connection with said arm and with the clutch lever, and a latch thrown into latching position by the application stroke of the brake pedal and serving to sustain the clutch lever in non-clutching position.

4. In automobile control, the combination of a clutch pedal, a brake pedal, a clutch lever, a latch attached to the clutch lever, and a link having a positive connection with the brake pedal and with said latch and serving during its application stroke to shift the clutch lever and move the latch to a position where it will sustain the clutch lever in non-clutching position.

5. In automobile control, the combination of a clutch pedal, a brake pedal, a clutch lever, a latch attached to the clutch lever, a link connecting the brake pedal with said latch and serving during its application stroke to shift the clutch lever and move the latch to a position where it will sustain the clutch lever in non-clutching position, and another link connecting the clutch pedal with said latch and operating to release the latch while shifting the clutch lever.

6. In automobile control, the combination of a clutch pedal, a brake pedal, a clutch lever, an operating element having a positive connection with the brake pedal and clutch lever, and means operated by the brake pedal during its application stroke serving to latch the clutch lever in non-clutching position.

7. In automobile control, the combination of a clutch pedal, a brake pedal, a clutch lever, an operating element having a positive connection with the brake pedal and clutch lever, means operated by the brake pedal during its application stroke serving to latch the clutch lever in non-clutching position, and means operated by the clutch pedal serving to release and actuate the clutch lever with which it has a positive connection.

In testimony whereof I affix my signature in presence of two witnesses.

GEORGE C. PLUMMER.

Witnesses:
　JOHN G. HIPP,
　JULIA DRUMMOND.

Copies of this patent may be obtained for five cents each, by addressing the "Commissioner of Patents, Washington, D. C."